United States Patent [19]

Sugita

[11] Patent Number: 4,953,907
[45] Date of Patent: Sep. 4, 1990

[54] MOLDING FOR CAR WINDOWPANE

[75] Inventor: Tooru Sugita, Okazaki, Japan

[73] Assignee: Nifco Inc., Yokohama, Japan

[21] Appl. No.: 337,843

[22] Filed: Apr. 13, 1989

[51] Int. Cl.⁵ .............................................. B60J 1/02
[52] U.S. Cl. .................................... 296/93; 428/120; 52/400
[58] Field of Search .................... 428/31, 120; 296/93; 52/400

[56] References Cited

U.S. PATENT DOCUMENTS

| | | | |
|---|---|---|---|
| 3,659,896 | 5/1972 | Smith et al. | 296/93 |
| 4,635,947 | 1/1987 | Hatayama | 296/93 |
| 4,833,847 | 5/1989 | Inayama et al. | 296/93 |

FOREIGN PATENT DOCUMENTS 58-49847 11/1983 Japan.
63-258212 10/1988 Japan.

Primary Examiner—Alexander S. Thomas
Attorney, Agent, or Firm—Oblon, Spivak, McClelland, Maier & Neustadt

[57] ABSTRACT

A plastic molding for a car windowpane includes a strip-like upper portion bridging a gap between a windowpane and a window opening edge to seal the gap, and a leg portion depending from the upper portion and having first and second engaging portions extending from a free end thereof in opposite directions. The upper portion of the plastic molding has opposite side portions, which are in contact with the windowpane and the window opening edge, made of a synthetic resin material having been subjected to friction reduction treatment.

4 Claims, 2 Drawing Sheets

MOLDING FOR CAR WINDOWPANE

BACKGROUND OF THE INVENTION

1. Field of the Invention

This invention relates to an ornamental molding to be mounted to seal a gap between the edge of a car window opening and the corresponding edge of a windowpane fitted in and secured with adhesive to; the window opening.

2. Description of the Prior Art

Japanese Utility Model Publication 58-49847 discloses a molding for concealing a gap along the edge of a car windowpane.

This molding serves to ornamentally seal the gap along the windowpane edge, drain rain water entering the gap and prevent intrusion of dust. For this reason, it is strongly held in tight contact with the windowpane and the edge of the window opening.

As is well known in the art, a molding of this type includes a strip-like upper portion bridging the gap between the windowpane edge and the window opening edge and a leg portion depending from the upper portion into the gap to engage with the windowpane edge or secured to the same with adhesive provided to secure the window pane. It is integrally molded from synthetic resin. It is mounted such that the opposite side portions of the upper portion are urged against the upper surface of the windowpane and window opening edge by making use of the elasticity of the material. The molding thus mounted along the windowpane edge is firmly secured with adhesive. However, since the upper portion sealing the gap is merely urged against the windowpane and window opening edge and held in tight contact with the same by utilizing the elasticity of the material, when a strain in the car body causes a strain in the window opening edge, the upper portion urged against the window opening edge shifts in position, producing an unpleasant noise. Strain in the car body generally occurs when the car is running, and the resulting squeak annoys the driver and passengers. The squeaky sound is sometimes mistaken to be a sound resulting from engine malfunction.

SUMMARY OF THE INVENTION

This invention has been accomplished in order to avoid generation of the unpleasant noise produced by friction between the molding and the car body or windowpane fitted in the window, and its object is to provide a molding which ensures tight contact thereof with the window opening edge and windowpane, effectively seals the gap between the window opening edge and the windowpane and effectively prevents an unpleasant noise from being produced when, with the molding urged against the window opening edge and windowpane, a strain arises in the car body.

To attain the above object of the invention, there is provided a plastic molding for a car windowpane to be disposed between a windowpane mounting recess provided in an edge of a window opening and a corresponding edge of a windowpane to seal a gap between the two when fitting the windowpane edge in the recess and securing the two to each other with an adhesive filling a space between a flange portion of the recess and the lower surface of the windowpane, the plastic molding including a strip-like upper portion bridging the gap between the windowpane and the window opening edge to seal the gap, a leg portion depending from the upper portion and having a free end thrust into the adhesive and first and second engaging portions extending from the free end of the leg portion toward the windowpane and an edge wall of the recess, respectively, opposite side portions of the upper portion in contact with the windowpane and the window opening edge being made of a synthetic resin material having been subjected to friction reduction treatment.

In one friction reduction treatment which can be adopted in the invention, opposite side portions of an upper portion to be held in contact with the windowpane and window opening edge are made of a plastic material containing paraffin wax as a slipping agent having an excellent slipping property to provide satisfactory slippage of the contact portions and eliminate generation of an unpleasant noise. In another, a tape having an excellent slipping property is applied to the surface of the contact portions to reduce the frictional force. In still another, a low friction paint is applied in lieu of the tape to the contact portion surfaces to reduce the frictional force due to urging of the molding against the windowpane and window opening edge.

The molding having portions, which are urged against the windowpane and window opening edge, subjected to friction reduction treatment is prevented from strong friction due to its slipping property when a strain in the car body causes its friction with the window opening edge or the windowpane secured thereto, so that no squeaking or other unpleasant noise is produced.

The above and other objects and features of the invention will become more apparent from the following detailed description with reference to the accompanying drawings.

DESCRIPTION OF THE PREFERRED EMBODIMENTS

Figure 1:
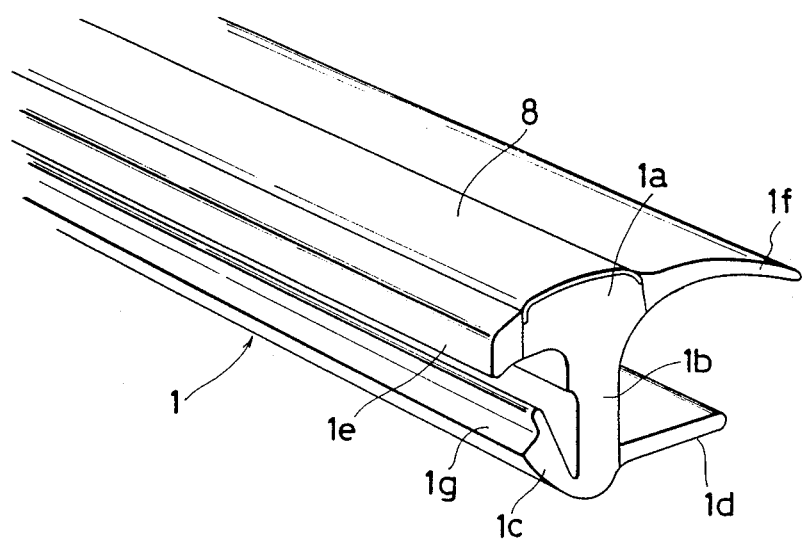
FIG. 1 is a perspective view showing one embodiment of the molding according to the invention.
Figure 2:
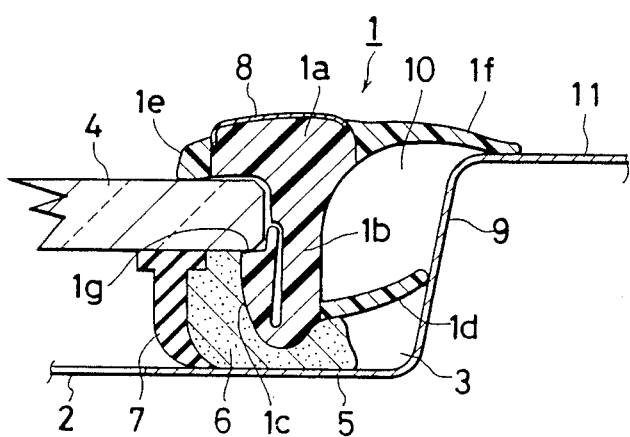
FIG. 2 is a sectional view showing the molding of FIG. 1 in use.

FIG. 1 is a perspective view showing a first embodiment of the molding according to the invention, and FIG. 2 is a sectional view showing the same molding in use. Referring to FIG. 2, reference numeral 1 designates the molding as a whole, 2 a recess provided along the edge of an opening of a car window 3, 4 a windowpane disposed in the recess 2 such that its edge faces a flange portion 5 of the recess 2, 6 adhesive for securing the windowpane 4 to the flange portion 5, and 7 a rubber dam to prevent outflow of the adhesive 6.

The molding 1 has an upper portion 1a, a leg portion 1b and first and second engaging portions 1c and 1d. As can be seen in the sectional profile shown in FIG. 2, the upper portion 1a has a large thickness in a central portion and has opposite side portions 1e and 1f of a reduced thickness and increased flexibility. The leg portion 1b depends inwardly from the central portion of the upper portion 1a. The first and second engaging portions 1c and 1d extend from the inner end of the leg portion 1b in opposite directions. The first engaging portion 1c is folded back along one side of the leg portion 1b, whereas the second engaging portion 1d is substantially perpendicular to the other side of the leg portion 1b. An ornamental tape piece 8 is applied to the upper surface of the central portion of the upper portion 1a over its entire length.

The molding 1 is a one-piece molding formed by extrusion-molding a synthetic resin having appropriate rigidity and flexibility, such as vinyl chloride. Particularly, in this embodiment a resin material containing paraffin wax is used for the opposite side reduced thickness portions 1e and 1f of the upper portion 1a and for the second engaging portion 1d.

The molding 1 is molded by an extruction molder, the die of which has an inner shape complementary to the shape of the molding in sectional profile. The extruder is provided with nozzles for forming the opposite side reduced thickness portions 1e and 1f and second engaging portion 1d separately from a nozzle through which the molten synthetic resin material for forming the central portion of the upper portion 1a, leg portion 1b and first engaging portion 1c is supplied. The first-noted nozzles supply molten synthetic resin containing paraffin wax. The nozzles supply molten materials simultaneously and continuously to the molder at rates corresponding to the area ratios of the molding areas. Thus, a molding having specific portions made of synthetic resin containing paraffin wax is extruded continuously from the molder.

The molding 1, partly made of material containing paraffin wax, is mounted as shown in FIG. 2. In the mounting operation, the windowpane 4 is disposed in the recess 2 and its edge is secured to the flange portion 5 by adhesive 6 provided between the molding 1 and the flange portion 5. At this time, the leg portion 1b of the molding is inserted into a gap 10 between an edge wall 9 of the recess 2 and the corresponding windowpane edge.

When the leg portion 1b is inserted into the gap 10, the first engaging portion 1c is flexed inwardly by the corresponding edge of the windowpane, an engagement surface 1g at the free end of the portion 1c engages with the lower surface of the windowpane edge, the first engaging portion 1c is pushed together with the end of the leg portion 1b into the adhesive 6, and the free end of the second engaging portion 1d extending perpendicularly to the leg portion 1b is engaged with the inner surface of the edge wall 9 to give rise to a reaction force for urging the leg portion 1b against the windowpane edge, thus ensuring the engagement of the first engaging portion 1c. When the leg portion 1b has been fully inserted, the upper portion 1a, together with the opposite side reduced thickness portions 1e and 1f, bridges the gap between the upper surface at the edge of the windowpane 4 and a wall 11 extending from the edge wall 9, thus sealing the gap 10.

As has been shown, when the molding according to the invention is mounted with respect to the windowpane edge, the gap 10 is sealed, and also in this embodiment the opposite side reduced thickness portions 1e and 1f of the upper portion 1a and also second engaging portion 1d are urged against the upper surface of the windowpane and the edge of the window opening. As these portions are made of synthetic resin containing paraffin wax, satisfactory slipping of the urged portions is permitted, thus eliminating production of a harsh sound even when the window opening edge is strained at the time a strain arises in the car body during running thereof.

Figure 3:
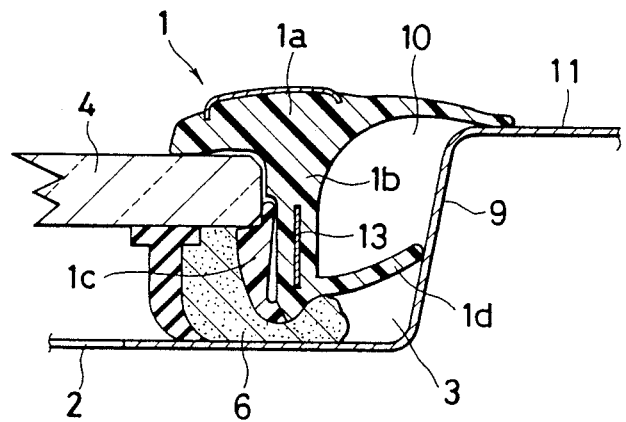
FIG. 3 is a sectional view showing a different embodiment of the molding according to the invention in use.

FIG. 3 is a sectional view showing a second embodiment of the molding according to the invention in use.

In this embodiment, the first engaging portion 1c of the molding 1 is made of vinyl chloride, and the other portion of the molding, i.e., upper portion 1a, leg portion 1b and second engaging portion 1d, are made integrally of vinyl chloride containing paraffin wax.

Figure 4:
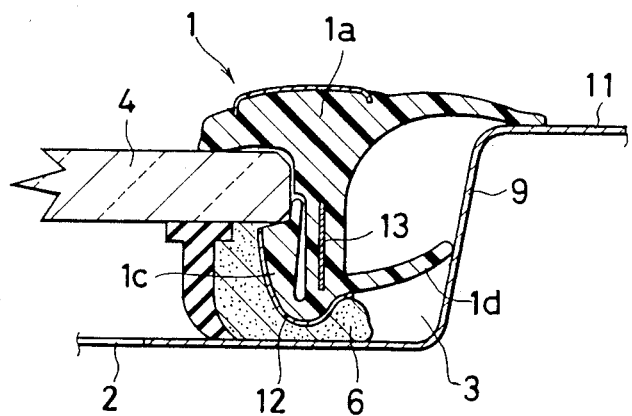
FIG. 4 is a sectional view showing a further embodiment of the molding according to the invention in use.

FIG. 4 is a sectional view showing a third embodiment of the molding according to the invention. In this embodiment, the entire molding 1 is made of a synthetic resin containing paraffin wax, and an adhesive tape 12 having an excellent adhesive property is applied to the surfaces of the first engaging portion 1c and leg portion 1b in contact with the adhesive 6 to enhance adhesion between the synthetic resin containing paraffin wax and the adhesive 6. The adhesive tape 12 may be made of acetate ester.

In either of the above two embodiments, portions of the molding in contact with the windowpane 4 and window opening edge are made of a synthetic resin containing paraffin wax having an excellent slipping property, thus reducing the frictional resistance and avoiding squeaking that might otherwise be produced by slipping.

In FIGS. 3 and 4, reference numeral 13 designates a reinforcing member made of a metal embedded in the center of the leg portion 1b along the entire length thereof to reinforce the molding 1.

The molding according to the invention has been described in conjunction with three embodiments thereof. In each, the portions of the molding urged against a window opening edge and also against the windowpane fitted in and secured with adhesive to the window are provided with friction reduction treatment by incorporating paraffin wax having excellent slipping property. Thus, when a shift occurs in the urged portions due to stain in the car body during running of the car, no strong friction occurs, and it is possible to effectively avoid squeaking or other harsh noise.

Further, the molding according to the invention can be formed as a one-piece molding by ordinary extrusion molding of synthetic resin even in case where it is totally or partly made of a material containing paraffin wax or the like having excellent slipping property. Thus, it is possible to produce a product, which has excellent productivity comparable with prior art products.

Of course, where a tape is used, it may be applied to the desired portion. Where paint having excellent slipping property is applied to a desired surface in lieu of tape, a roller or the like may be used for application, so that the paint may be readily applied.

What is claimed is:

1. A molding assembly for a car windowpane disposed between a windowpane mounting recess provided in an edge wall of a window opening and a corresponding edge of the windowpane to seal a gap formed therebetween, wherein said molding assembly comprises:

an adhesive connected to said edge wall;
a strip upper portion bridging the gap between said windowpane and the edge wall of said window opening;
a leg portion depending from said strip upper portion and having a free end positioned in said adhesive;

a first engaging portion extending from said free end towards said windowpane and being integrally molded with said leg portion; and a second engaging portion extending toward the edge wall of said recess and being integrally molded with said leg portion, at least opposite sides of said strip upper portion contacting the edge of said opening window and said windowpane being made of a synthetic resin having a reduced frictional characteristic.

2. The molding according to claim 1, wherein said second engaging portion is made of a synthetic resin provided with a friction reduction treatment.

3. The molding according to claim 2, wherein said synthetic resin provided with the friction reduction treatment contains paraffin wax.

4. The molding according to claim 1, wherein said synthetic resin provided with the friction reduction treatment contains paraffin wax.

* * * * *